United States Patent [19]
Yuta

[11] 4,200,352
[45] Apr. 29, 1980

[54] LENS SYSTEM FOR MICRO FILM

[75] Inventor: Koichi Yuta, Mitaka, Japan

[73] Assignee: Olympus Optical Co., Ltd., Tokyo, Japan

[21] Appl. No.: 932,219

[22] Filed: Aug. 9, 1978

[30] Foreign Application Priority Data

Aug. 17, 1977 [JP] Japan .................... 52/98438

[51] Int. Cl.² .................... G02B 13/14; G02B 9/64
[52] U.S. Cl. .................... 350/1.2; 350/214
[58] Field of Search .................... 350/1.2, 214, 176

[56] References Cited

U.S. PATENT DOCUMENTS 3,817,602  6/1974  Kazamaki et al. .................... 350/214

FOREIGN PATENT DOCUMENTS 155960  3/1964  U.S.S.R. .................... 350/1.2

Primary Examiner—Paul A. Sacher
Attorney, Agent, or Firm—Cushman, Darby & Cushman

[57] ABSTRACT

A lens system for micro film which provides high resolution over a wide range with a ultraviolet ray, and has transmittance sufficient for said ray and a long working distance on the image side. Said lens system comprises a first positive lens component, a second meniscus lens component, a third negative lens component, a fourth cemented doublet component, a fifth positive cemented doublet component, a sixth positive lens component and a seventh cemented doublet component consisting of a negative lens element and a positive lens element.

4 Claims, 6 Drawing Figures

LENS SYSTEM FOR MICRO FILM

BACKGROUND OF THE INVENTION (a) Field of the Invention

The present invention relates to a high resolution lens system for micro film.

(b) Description of the Prior Art

Though light sources emitting visible rays have conventionally been used for photographing on micro films, it is now demanded to photograph reduced images with higher resolution. Examinations made to meet such a demend have indicated that it is possible to photograph reduced images with higher resolution by using a light source emitting rays of higher energy and a sensitive material assuring higher resolution. Speaking concretely, rays emitted from a mercury lamp contains a line of 3650 Å which has very high energy. By using this line in combination with such a sensitive material as mentioned above, resolution can be enhanced up to $1\mu$.

However, the above-mentioned line has a short wavelength, thereby restricting use of glass material having high refractive index which reduces transmittance. It is therefore very difficult to design a lens system having high resolution.

SUMMARY OF THE INVENTION

A general object of the present invention is to provide a lens system for micro film which has high resolution over a wide range with ray of approximately 3650 Å in the ultraviolet region, sufficient transmittance for said ray and a long working distance on the image side.

The lens system for micro film according to the present invention has such a composition as shown in FIG. 1 and comprises a first positive lens component, a second meniscus lens component, a third negative lens component, a fourth cemented doublet component having a concave surface on the object side, a fifth positive cemented doublet component, a sixth positive lens component and a seventh cemented doublet component having a concave surface on the image side and consisting of a negative lens element and a positive lens element. Said lens system is so designed as to satisfy the following conditions:

(1) $1.49f < r_4 < 1.51f$
(2) $-0.2/f < 1/r_5 < 0.08f$
(3) $0.46f < r_6 < 0.48f$
(4) $-0.47f < r_7 < -0.45f$ wherein the reference symbols represent as defined below:

$r_4, r_5$, $r_6$ and $r_7$: radii of curvature on the image side surface of the second lens component, the surfaces on both sides of the third lens component and the object side surface of the fourth lens component respectively.

f: focal length of the entire lens system as a whole

Of the conditions mentioned above, the condition (1) is required for correcting distortion effectively. If radius of curvature $r_4$ is smaller than the lower limit of the condition (1), coma will be aggravated. If $r_4$ exceeds the upper limit of the condition (1), in contrast, distortion will be undercorrected.

The condition (2) is defined for correcting coma effectively. If $1/r_5$ is smaller than the lower limit of the condition, (2), distortion and astigmatism will be aggravated. If $1/r_5$ exceeds the upper limit of the condition (5), correcting function for coma will be insufficient.

The conditions (3) and (4) are necessary for correcting spherical aberration and curvatue of field effectively. If $r_6$ is smaller than the lower limit of the condition (3) or if $r_7$ exceeds the upper limit of the condition (4), spherical aberration and curvature of field will be overcorrected. If $r_6$ is larger than the upper limit of the condition (3) or if $r_7$ is smaller than the lower limit of the condition (4), in contrast, spherical aberration and curvature of field will be undercorrected.

In the lens system according to the present invention described above, it is possible to facilitate correction of distortion by adding a positive lens element on the object side of the first lens component as shown in FIG. 4. Further, it is preferable for correcting aberrations to arrange all the cemented surfaces in such a direction that all the concave surfaces face the image side.

DETAILED DESCRIPTION OF THE PREFERRED EMBODIMENTS

Figure 1:
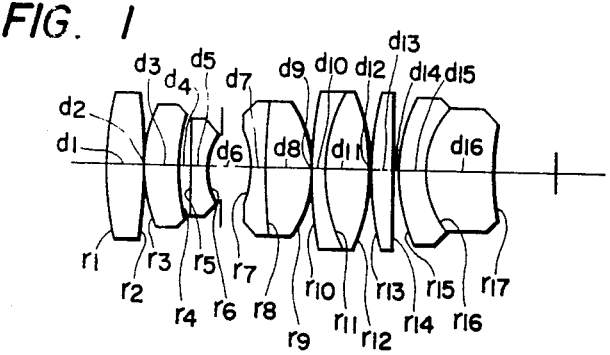
FIG. 1 shows a sectional view illustrating the composition of the Embodiment 1.

Now, some preferred embodiments of the present invention will be described detailedly with reference to the accompanying drawings.

EMBODIMENT 1

| $f = 1.0, \beta = 1/10, N.A = 0.3$ | | | |
|---|---|---|---|
| $r_1 = 1.6944$ | | | |
| | $d_1 = 0.2531$ | $n_1 = 1.65306$ | $\nu_1 = 60.2$ |
| $r_2 = -7.9950$ | | | |
| | $d_2 = 0.0027$ | | |
| $r_3 = 0.9213$ | | | |
| | $d_3 = 0.2268$ | $n_2 = 1.75176$ | $\nu_2 = 51.3$ |
| $r_4 = 1.5006$ | | | |
| | $d_4 = 0.0757$ | | |
| $r_5 = 12.8265$ | | | |
| | $d_5 = 0.1209$ | $n_3 = 1.52619$ | $\nu_3 = 64.0$ |
| $r_6 = 0.4699$ | | | |
| | $d_6 = 0.2956$ | | |
| $r_7 = -0.4592$ | | | |
| | $d_7 = 0.0947$ | $n_4 = 1.80878$ | $\nu_4 = 47.4$ |
| $r_8 = 4.9587$ | | | |
| | $d_8 = 0.3022$ | $n_5 = 1.65306$ | $\nu_5 = 60.2$ |
| $r_9 = -0.7641$ | | | |
| | $d_9 = 0.0039$ | | |
| $r_{10} = 2.6951$ | | | |
| | $d_{10} = 0.0757$ | $n_6 = 1.69992$ | $\nu_6 = 32.1$ |
| $r_{11} = 0.9254$ | | | |
| | $d_{11} = 0.3022$ | $n_7 = 1.65306$ | $\nu_7 = 60.2$ |
| $r_{12} = -1.2079$ | | | |
| | $d_{12} = 0.0037$ | | |
| $r_{13} = 1.8887$ | | | |
| | $d_{13} = 0.1588$ | $n_8 = 1.65306$ | $\nu_8 = 60.2$ |
| $r_{14} = -299.8532$ | | | |
| | $d_{14} = 0.0259$ | | |
| $r_{15} = 0.9668$ | | | |
| | $d_{15} = 0.1890$ | $n_9 = 1.75376$ | $\nu_9 = 29.2$ |
| $r_{16} = 0.5543$ | | | |
| | $d_{16} = 0.4320$ | $n_{10} = 1.65306$ | $\nu_{10} = 60.2$ |

-continued

| $f = 1.0, \beta = 1/10, \text{N.A} = 0.3$ |
|---|
| $r_{17} = 1.3012$ |

EMBODIMENT 2

| $f = 1.0, \beta = 1/10, \text{N.A.} = 0.3$ | | | |
|---|---|---|---|
| $r_0 = -33.8952$ | | | |
| | $d_0 = 0.2598$ | $n_0 = 1.49593$ | $\nu_0 = 69.8$ |
| $r_{0'} = -5.9913$ | | | |
| | $d_{0'} = 0.9724$ | | |
| $r_1 = 1.7523$ | | | |
| | $d_1 = 0.2485$ | $n_1 = 1.65306$ | $\nu_1 = 60.2$ |
| $r_2 = -12.1051$ | | | |
| | $d_2 = 0.0027$ | | |
| $r_3 = 0.9230$ | | | |
| | $d_3 = 0.2224$ | $n_2 = 1.75176$ | $\nu_2 = 51.3$ |
| $r_4 = 1.5059$ | | | |
| | $d_4 = 0.0741$ | | |
| $r_5 = -89.4819$ | | | |
| | $d_5 = 0.1188$ | $n_3 = 1.52619$ | $\nu_3 = 64.0$ |
| $r_6 = 0.4651$ | | | |
| | $d_6 = 0.2901$ | | |
| $r_7 = -0.4534$ | | | |
| | $d_7 = 0.0927$ | $n_4 = 1.80878$ | $\nu_4 = 47.4$ |
| $r_8 = 5.2371$ | | | |
| | $d_8 = 0.2969$ | $n_5 = 1.65306$ | $\nu_5 = 60.2$ |
| $r_9 = -0.7660$ | | | |
| | $d_9 = 0.0038$ | | |
| $r_{10} = 3.0174$ | | | |
| | $d_{10} = 0.0741$ | $n_6 = 1.69992$ | $\nu_6 = 32.1$ |
| $r_{11} = 0.9575$ | | | |
| | $d_{11} = 0.2969$ | $n_7 = 1.65306$ | $\nu_7 = 60.2$ |
| $r_{12} = -1.1374$ | | | |
| | $d_{12} = 0.0038$ | | |
| $r_{13} = 1.7454$ | | | |
| | $d_{13} = 0.1558$ | $n_8 = 1.65306$ | $\nu_8 = 60.2$ |
| $r_{14} = \infty$ | | | |
| | $d_{14} = 0.0253$ | | |
| $r_{15} = 0.8624$ | | | |
| | $d_{15} = 0.1853$ | $n_9 = 1.75376$ | $\nu_9 = 29.2$ |
| $r_{16} = 0.5138$ | | | |
| | $d_{16} = 0.4240$ | $n_{10} = 1.65306$ | $\nu_{10} = 60.2$ |
| $r_{17} = 1.1629$ | | | | wherein the reference symbols $r_1$ through $r_{17}$ represent radii of curvature on the surfaces of the respective lens elements, the reference symbols $d_1$ through $d_{16}$ designate thicknesses of the respective lens elements and airspaces therebetween, the reference symbols $n_1$ through $n_{10}$ denote refractive indices for a line of 3650 Å of the respective lens elements and the reference symbols $\nu_1$ through $\nu_{10}$ represent Abbe's numbers for the d line of the respective lens elements. Seidel's coefficients for the above-described embodiments are as listed below:

EMBODIMENT 1

| | A | B | Γ | P | □ |
|---|---|---|---|---|---|
| 1 | 0.072 | 0.042 | 0.055 | 0.234 | 0.212 |
| 2 | 0.038 | 0.439 | −0.130 | 0.049 | −1.644 |
| 3 | 0.004 | 0.005 | 0.005 | 0.468 | 0.510 |
| 4 | 0.007 | 0.511 | −0.061 | −0.287 | −1.853 |
| 5 | −0.097 | −0.733 | 0.267 | 0.027 | 1.938 |
| 6 | −0.377 | −0.328 | −0.351 | −0.737 | −0.993 |
| 7 | −0.410 | −0.158 | −0.254 | −0.978 | 0.705 |
| 8 | −0.106 | −0.287 | −0.174 | −0.010 | −0.491 |
| 9 | 0.025 | 0.004 | −0.011 | 0.519 | −0.229 |
| 10 | 0.161 | 0.947 | 0.390 | 0.153 | 2.670 |
| 11 | −0.062 | −0.152 | −0.097 | −0.018 | −0.266 |
| 12 | 0.472 | 0.027 | 0.113 | 0.328 | 0.085 |
| 13 | −0.002 | −0.128 | −0.018 | 0.210 | 0.562 |
| 14 | 0.162 | 0.026 | −0.065 | 0.001 | −0.011 |
| 15 | −0.012 | −0.421 | −0.071 | 0.446 | 0.147 |
| 16 | 0.004 | 0.035 | 0.012 | −0.063 | −0.080 |
| 17 | 0.106 | 0.152 | −0.127 | −0.305 | 0.182 |
| Σ | −0.012 | −0.017 | −0.011 | 0.039 | 1.446 |

EMBODIMENT 2

| | A | B | Γ | P | □ |
|---|---|---|---|---|---|
| 1 | 0.000 | 0.044 | 0.003 | −0.009 | 0.477 |
| 2 | 0.000 | 0.007 | −0.000 | 0.055 | −1.071 |
| 3 | 0.033 | 0.041 | 0.037 | 0.226 | 0.297 |
| 4 | 0.024 | 0.438 | −0.103 | 0.032 | −1.997 |
| 5 | 0.000 | 0.001 | 0.000 | 0.466 | 0.620 |
| 6 | 0.006 | 0.538 | −0.058 | −0.286 | −2.310 |
| 7 | −0.090 | −0.828 | 0.273 | −0.003 | 2.518 |
| 8 | −0.298 | −0.311 | −0.304 | −0.744 | −1.077 |
| 9 | −0.286 | −0.179 | 0.226 | −0.989 | 0.926 |
| 10 | −0.083 | −0.279 | −0.153 | −0.010 | −0.528 |
| 11 | 0.007 | 0.003 | −0.004 | 0.517 | −0.336 |
| 12 | 0.126 | 0.944 | 0.345 | 0.137 | 2.954 |
| 13 | −0.049 | −0.147 | −0.085 | −0.017 | −0.285 |
| 14 | 0.388 | 0.025 | 0.099 | 0.348 | 0.095 |
| 15 | −0.002 | −0.099 | −0.016 | 0.227 | 0.764 |
| 16 | 0.128 | 0.031 | −0.063 | 0 | −0.015 |
| 17 | −0.017 | −0.440 | −0.088 | 0.500 | 0.300 |
| 18 | 0.003 | 0.037 | 0.012 | −0.067 | −0.095 |
| 19 | 0.095 | 0.164 | −0.125 | −0.341 | 0.231 |
| Σ | −0.014 | −0.008 | −0.005 | 0.042 | 1.469 |

Figure 2:
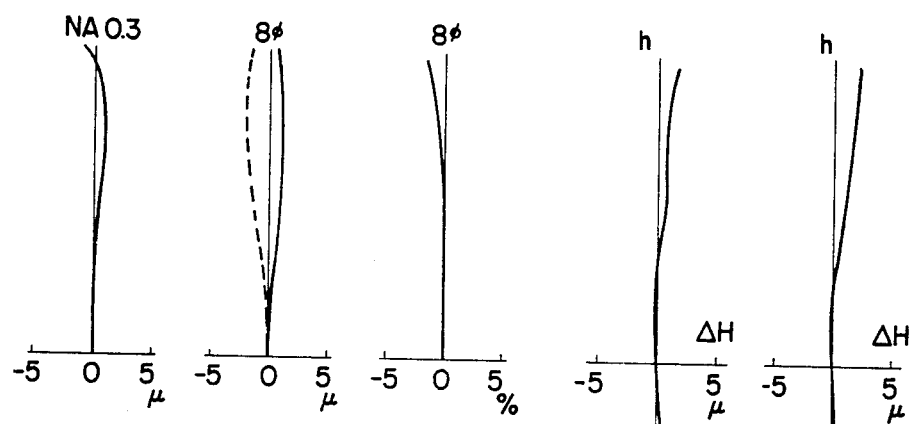
FIG. 2 shows graphs illustrating the aberration characteristics of the Embodiment 1.
Figure 3:
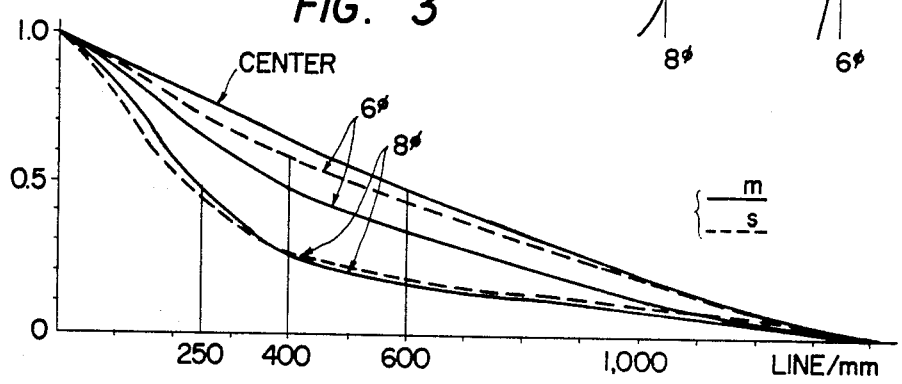
FIG. 3 illustrates graphs showing the OTF characteristics of the Embodiment 1.
Figure 4:
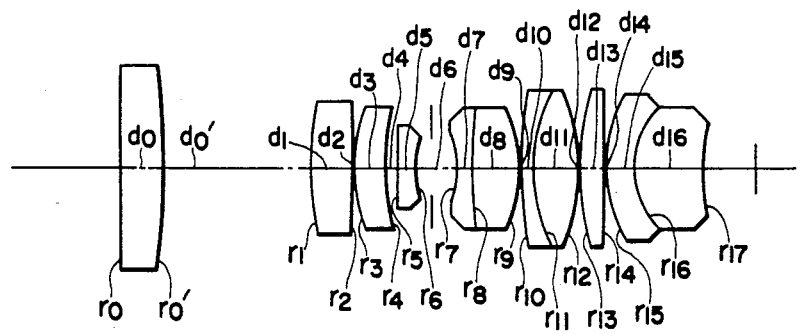
FIG. 4 illustrates a sectional view showing the composition of the Embodiment 2.
Figure 5:
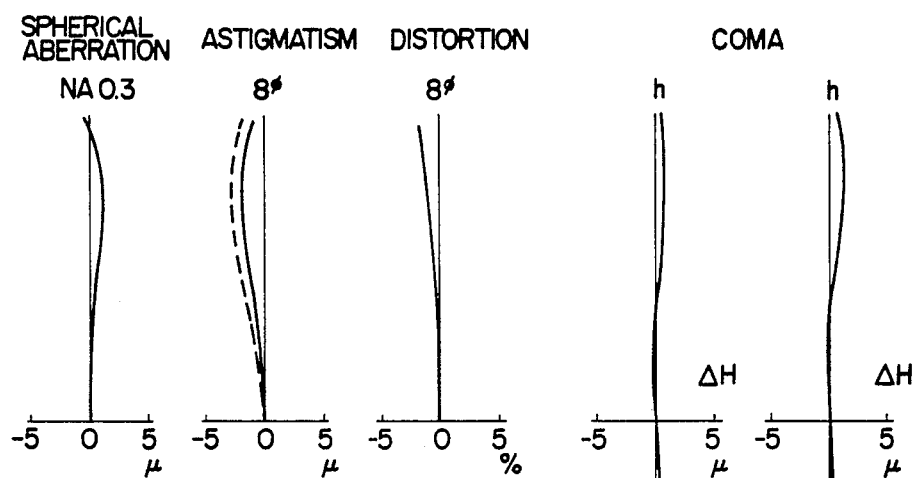
FIG. 5 shows graphs illustrating the aberration characteristics of the Embodiment 2.
Figure 6:
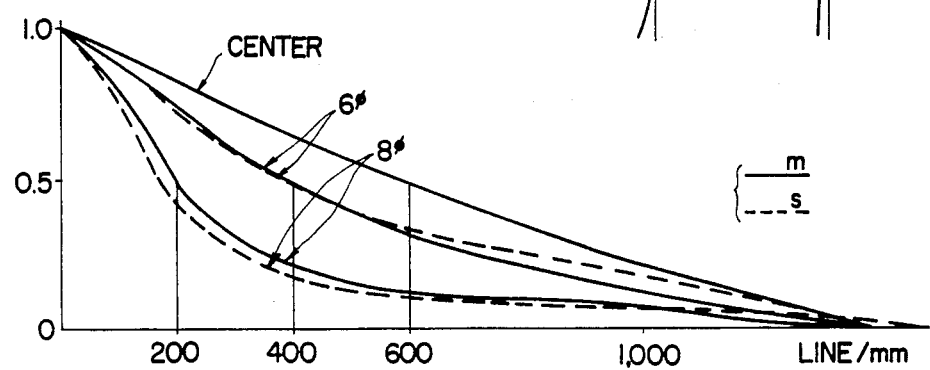
FIG. 6 shows curves illustrating the OTF characteristics of the Embodiment 2.

Of the embodiments described above, the Embodiment 1 has such a composition as shown in FIG. 1, such aberration characteristics as illustrated in FIG. 2 and such OTF characteristics as shown in FIG. 3. The Embodiment 2 has such a composition as shown in FIG. 4 in which a positive lens element is added on the object side of the first lens component. Radii of curvature on both the sides of this positive lens element are represented by the reference symbols $r_0$ and $r_0'$ respectively, whereas thickness thereof and the airspace formed between said lens element and the first lens component are designated by the reference symbols $d_0$ and $d_{0'}$ respectively, refractive index and Abbe's number of the material of said lens element being denoted by the reference symbols $n_0$ and $\nu_0$ respectively. The aberration characteristics are illustrated in FIG. 5 and OTF characteristics thereof are shown in FIG. 6.

I claim:

1. A lens system for micro film comprising a first positive lens component, a second meniscus lens component, a third negative lens component, a fourth cemented doublet component having a concave surface on the object side, a fifth positive cemented doublet component, a sixth positive lens component and a seventh cemented doublet component having a concave surface on the image side and consisting of a negative lens element and a positive lens element, and said lens system satisfying the following conditions:

(1) $1.49f < r_4 < 1.51f$
(2) $-0.02f < 1/r_5 < 0.08/f$
(3) $0.46f < r_6 < 0.48f$
(4) $-0.47f < r_7 < -0.45f$ wherein the reference symbols $r_4$, $r_5$ and $r_6$ represent radii of curvature of the image side surface of the second lens component, the object side surface and image side surface of the third lens component and object side surface of the fourth lens component respectively and the reference symbol f designates focal length of the entire lens system as a whole.

2. A lens system for micro film according to claim 1 having the following numerical data:

| | $f = 1.0$, $\beta = 1/10$, N.A $= 0.3$ | | | |
|---|---|---|---|---|
| $r_1 = 1.6944$ | | | | |
| | $d_1 = 0.2531$ | $n_1 = 1.65306$ | $\nu_1 = 60.2$ | |
| $r_2 = -7.9950$ | | | | |
| | $d_2 = 0.0027$ | | | |
| $r_3 = 0.9213$ | | | | |
| | $d_3 = 0.2268$ | $n_2 = 1.75176$ | $\nu_2 = 51.3$ | |
| $r_4 = 1.5006$ | | | | |
| | $d_4 = 0.0757$ | | | |
| $r_5 = 12.8265$ | | | | |
| | $d_5 = 0.1209$ | $n_3 = 1.52619$ | $\nu_3 = 64.0$ | |
| $r_6 = 0.4699$ | | | | |
| | $d_6 = 0.2956$ | | | |
| $r_7 = -0.4592$ | | | | |
| | $d_7 = 0.0947$ | $n_4 = 1.80878$ | $\nu_4 = 47.4$ | |
| $r_8 = 4.9587$ | | | | |
| | $d_8 = 0.3022$ | $n_5 = 1.65306$ | $\nu_5 = 60.2$ | |
| $r_9 = -0.7641$ | | | | |
| | $d_9 = 0.0039$ | | | |
| $r_{10} = 2.6951$ | | | | |
| | $d_{10} = 0.0757$ | $n_6 = 1.69992$ | $\nu_6 = 32.1$ | |
| $r_{11} = 0.9254$ | | | | |
| | $d_{11} = 0.3022$ | $n_7 = 1.65306$ | $\nu_7 = 60.2$ | |
| $r_{12} = -1.2079$ | | | | |
| | $d_{12} = 0.0037$ | | | |
| $r_{13} = 1.8887$ | | | | |
| | $d_{13} = 0.1588$ | $n_8 = 1.65306$ | $\nu_8 = 60.2$ | |
| $r_{14} = -299.8532$ | | | | |
| | $d_{14} = 0.0259$ | | | |
| $r_{15} = 0.9668$ | | | | |
| | $d_{15} = 0.1890$ | $n_9 = 1.75376$ | $\nu_9 = 29.2$ | |
| $r_{16} = 0.5543$ | | | | |
| | $d_{16} = 0.4320$ | $n_{10} = 1.65306$ | $\nu_{10} = 60.2$ | |
| $r_{17} = 1.3012$ | | | | | wherein the reference symbols $r_1$ through $r_{17}$ represent radii of curvature on the surfaces of the respective lens elements, the reference symbols $d_1$ through $d_{16}$ designate thicknesses of the respective lens elements and the airspaces therebetween, the reference symbols $n_1$ through $n_{10}$ denote refractive indices of the respective lens elements and the reference symbols $\nu_1$ through $\nu_{10}$ represent Abbe's numbers of the respective lens elements.

3. A lens system for micro film according to claim 1 wherein a positive lens element is added on the object side of said first lens component.

4. A lens system for micro film according to claim 3 having the following numerical data:

| | $f = 1.0$, $\beta = 1/10$, N.A $= 0.3$ | | | |
|---|---|---|---|---|
| $r_0 = -33.8952$ | | | | |
| | $d_0 = 0.2598$ | $n_0 = 1.49593$ | $\nu_0 = 69.8$ | |
| $r_{0'} = -5.9913$ | | | | |
| | $d_{0'} = 0.9724$ | | | |
| $r_1 = 1.7523$ | | | | |
| | $d_1 = 0.2485$ | $n_1 = 1.65306$ | $\nu_1 = 60.2$ | |
| $r_2 = -12.1051$ | | | | |
| | $d_2 = 0.0027$ | | | |
| $r_3 = 0.9230$ | | | | |
| | $d_3 = 0.2224$ | $n_2 = 1.75176$ | $\nu_2 = 51.3$ | |
| $r_4 = 1.5059$ | | | | |
| | $d_4 = 0.0741$ | | | |
| $r_5 = -89.4819$ | | | | |
| | $d_5 = 0.1188$ | $n_3 = 1.52619$ | $\nu_3 = 64.0$ | |
| $r_6 = 0.4651$ | | | | |
| | $d_6 = 0.2901$ | | | |
| $r_7 = -0.4534$ | | | | |
| | $d_7 = 0.0927$ | $n_4 = 1.80878$ | $\nu_4 = 47.4$ | |
| $r_8 = 5.2371$ | | | | |
| | $d_8 = 0.2969$ | $n_5 = 1.65306$ | $\nu_5 = 60.2$ | |
| $r_9 = -0.7660$ | | | | |
| | $d_9 = 0.0038$ | | | |
| $r_{10} = 3.0174$ | | | | |
| | $d_{10} = 0.0741$ | $n_6 = 1.69992$ | $\nu_6 = 32.1$ | |
| $r_{11} = 0.9575$ | | | | |
| | $d_{11} = 0.2969$ | $n_7 = 1.65306$ | $\nu_7 = 60.2$ | |
| $r_{12} = -1.1374$ | | | | |
| | $d_{12} = 0.0038$ | | | |
| $r_{13} = 1.7454$ | | | | |
| | $d_{13} = 0.1558$ | $n_8 = 1.65306$ | $\nu_8 = 60.2$ | |
| $r_{14} = \infty$ | | | | |
| | $d_{14} = 0.0253$ | | | |
| $r_{15} = 0.8624$ | | | | |
| | $d_{15} = 0.1853$ | $n_9 = 1.75376$ | $\nu_9 = 29.2$ | |
| $r_{16} = 0.5138$ | | | | |
| | $d_{16} = 0.4240$ | $n_{10} = 1.65306$ | $\nu_{10} = 60.2$ | |
| $r_{17} = 1.1629$ | | | | | wherein the reference symbols $r_1$ through $r_{17}$ represent radii of curvature on the surfaces of the respective lens elements, the reference symbols $d_1$ through $d_{16}$ designate thicknesses of the respective lens elements and the airspaces therebetween, the reference symbols $n_1$ through $n_{10}$ denote refractive indices of the respective lens elements and the reference symbols $\nu_1$ through $\nu_{10}$ represent Abbe's numbers of the respective lene elements.

* * * * *